United States Patent [19]
Arrendondo

[11] Patent Number: 4,970,882
[45] Date of Patent: Nov. 20, 1990

[54] BICYCLE CABLE LOCK

[76] Inventor: Ralph A. Arrendondo, 114 W. Third St., San Dimas, Calif. 91773

[21] Appl. No.: 440,223

[22] Filed: Nov. 22, 1989

[51] Int. Cl.$^5$ .................... E05B 37/02; E05B 71/00
[52] U.S. Cl. ........................... 70/30; 70/233; 242/107.13
[58] Field of Search ............... 70/30, 49, 233, 258, 70/234; 242/107.1, 107.13

[56] References Cited

U.S. PATENT DOCUMENTS

| | | | |
|---|---|---|---|
| 372,260 | 10/1887 | Griswold | 242/107.13 |
| 1,472,206 | 10/1923 | Burkle | 70/30 |
| 2,451,100 | 10/1948 | Lecompte | 70/49 X |
| 3,903,719 | 9/1975 | Katz | 70/227 |
| 3,906,758 | 9/1975 | Hurwitt | 70/49 X |
| 3,950,972 | 4/1976 | Bleier et al. | 70/234 |
| 3,981,166 | 9/1976 | Madonna | 70/234 |
| 3,990,279 | 11/1976 | Brickel | 70/233 |
| 4,037,441 | 7/1977 | Ray | 70/233 |
| 4,044,577 | 8/1977 | Horlacher | 70/49 X |
| 4,112,720 | 9/1978 | Green | 70/233 |
| 4,126,024 | 11/1978 | Timmons et al. | 70/49 X |
| 4,165,053 | 8/1979 | Konig | 242/107.1 |
| 4,706,921 | 11/1987 | Paulin | 248/231.6 X |
| 4,756,171 | 7/1988 | Homar | 70/18 |

FOREIGN PATENT DOCUMENTS

| | | | |
|---|---|---|---|
| 65060 | 10/1946 | Denmark | 242/107.1 |
| 65185 | 5/1913 | Switzerland | 242/107.13 |
| 243551 | 1/1947 | Switzerland | 70/30 |

*Primary Examiner*—Lloyd A. Gall
*Attorney, Agent, or Firm*—Christie, Parker & Hale

[57] ABSTRACT

A locking apparatus suitable for securing a bicycle and which can be mounted on a bicycle frame. The apparatus includes a housing containing a pair of axially aligned independently rotatable cable storage reels. Retractable cables are fixed at one end to each reel and exit the housing through apertures in the external wall. Each cable can be separately dispensed through its respective aperture and can be of sufficently length to secure the bicycle to a stationary object or to be threaded through the frame, the spokes of the wheel, and around a post or other permanently affixed object, with the two free ends of the cable being fastenable to each other by a combination lock, padlock, or other locking means.

11 Claims, 3 Drawing Sheets

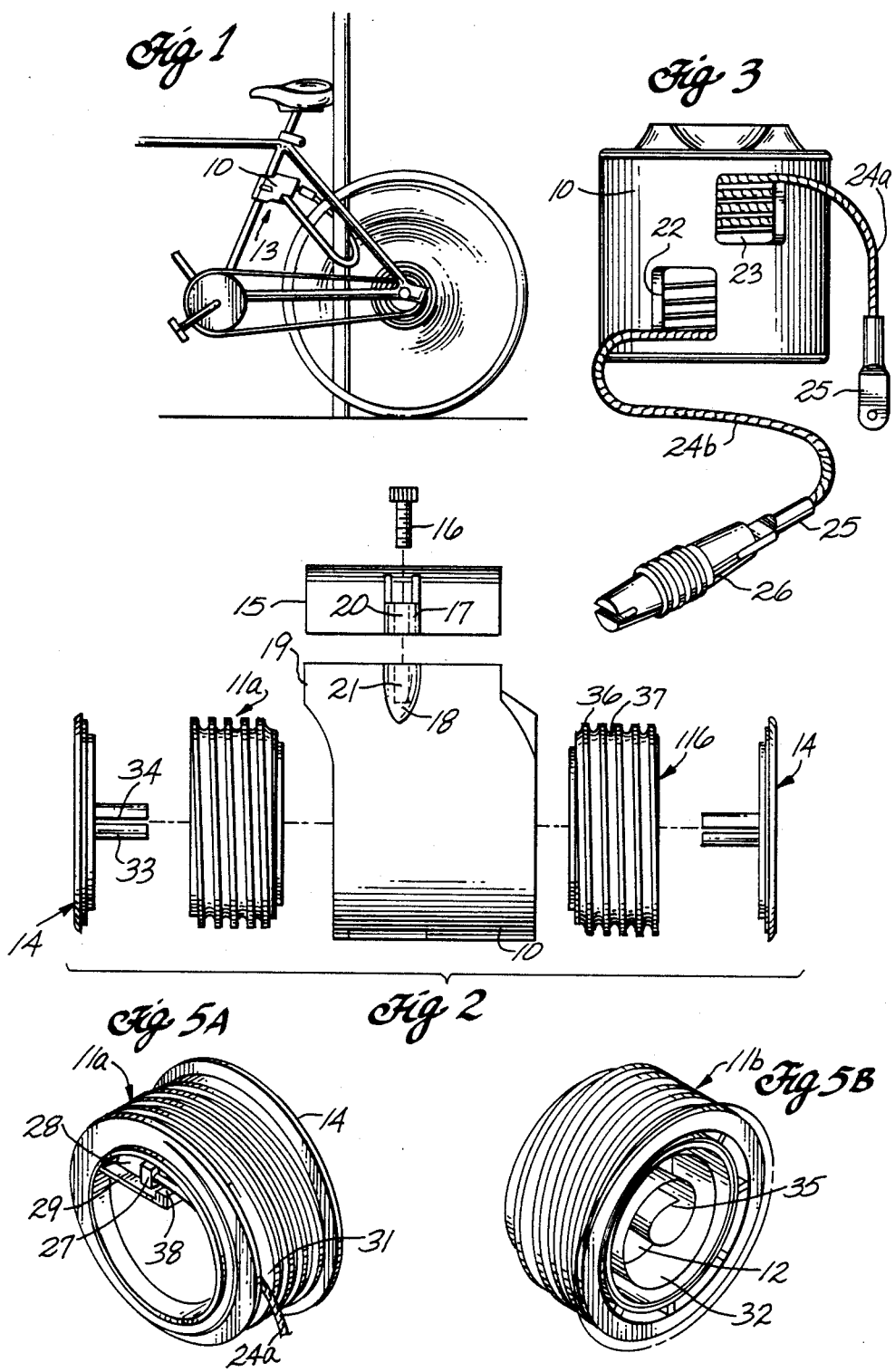

BICYCLE CABLE LOCK

BACKGROUND OF THE INVENTION

1. Field of the Invention:

This invention relates to the field of cable locks and in particular, to a lock suitable for securing bicycles.

2. Description of the Prior Art:

Bicycle theft has been a persistent problem, especially in urban areas. Cable locks have been employed to secure bicycles to immovable objects, such as lamp posts and fencing in an attempt to prevent theft of the bicycles. They have been also used to lock the wheels to the bicycle frame by threading the cable through the spokes of the wheel and an enclosed portion of the frame to prevent theft of the wheels. However, traditional cable locks tend to be bulky and inconvenient because they generally must be stowed by wrapping around the seat support or some portion of the frame.

Generally, such features as size, weight, strength, and convenience are important to the selection of a suitable lock. Some locks, such as disclosed in U.S. Pat. Nos. 3,950,972; 3,990,279; and 4,126,024; employ a reel for storing the cable inside a housing. In such arrangements a single reel is used for dispensing the cable, but the size and weight of these devices are not entirely satisfactory because a single reel lock must be relatively large and would therefore be heavy, unsightly and bulky would add to wind resistance. Large cable reels also pose a problem of finding a convenient position on the frame on which to mount the device.

Another problem with cable locks of the type previously known, particularly those utilizing a flat surface reel, is the potential for jamming when the cable is retracted because such locks generally lack any means to guide the cable into the housing.

The present invention overcomes the above described and other difficulties encountered in the prior art.

SUMMARY OF THE INVENTION

The present invention relates to a cable lock that combines small size and convenience. In accordance with the present invention there is provided a cable lock comprising a cylindrical housing within which are mounted a pair of adjacently disposed independently rotatable cable storage reels aligned along the central axis of the housing. Separated apertures are located in the housing by each reel. Elongated flexible cables are attached at one end to each reel and coiled about the reel, the free end of each cable exiting through its respective aperture. The reels are retractable and their surfaces are advantageously grooved so that the cable is guided and does not jam upon retraction. The free end of each cable has a loop or shackle and may be fastened to one another with a padlock or combination lock. The housing may be permanently attached to the tubular frame of a bicycle by a clamp or similar attachment means.

It is an object of the invention to provide a locking apparatus comprising:

a housing having an external wall, first and second apertures in said wall and a central axis;

first and second cable storage reels disposed within said housing adjacent each other, said reels being independently rotatable about said axis;

separate elongated flexible cables wound around each of said first and second cable storage reels with one end of each cable fixed to the reel and the other end extractable through one of said first and second apertures in the housing wall;

biasing means associated with each cable storage reel for biasing said reel in a cable retracted position against rotational movement;

means fixed to the free ends of said cables for enabling said cables to be secured to each other;

said separate cables being capable of being withdrawn and extended from said cable storage reels through said apertures to enable securing the ends thereof and of being automatically retracted onto said cable storage reels by the force of said biasing means when said cables are unsecured.

As set forth above, the present invention is a locking apparatus with a pair of reels encased inside a extracted from the housing and is self-retracting. In operation, the cables which are long enough, so that a free end extends through the apertures are pulled from the housing and, as the reels pay out the cables, one or both are threaded through the frame and wheels of the bicycle and/or around an immovable object such as a post. A cyclist may more rapidly secure the bicycle by pulling simultaneously on both cables, providing faster and less awkward securing of the bicycle than with a single cable. The two free ends of the cables are then fastened to one another by a padlock or other locking means. In one embodiment, the locking means are permanently fixed to the free end of one of the cables, enhancing convenience to the cyclist.

The housing may be attached to the bicycle by clamping the tubular frame between a pre-molded semi-cylindrical extension protruding from the housing and a second matching semi-cylindrical member attached to the first with screws or other fastening means. Should the housing be forcibly detached from the bicycle frame, the lock will still be effective as the single continuous loop formed by the two cables, attached at one end by locking means and at the other to the housing itself, remains unbroken. The entire locking apparatus is quite compact because of its twin-reel structure, and can be formed of lightweight, durable plastic to make it strong yet convenient for cyclists. The hollow casing may be advantageously sonically welded to prevent tampering with the locking mechanism.

BRIEF DESCRIPTION OF THE DRAWINGS

The invention will be better understood by reference to the drawings wherein:

FIG. 1 is a side elevation view of the rear portion of bicycle with the locking apparatus attached thereto;

FIG. 2 is an exploded side view of the bicycle lock;

FIG. 3 is a front view with the cables partially extended;

FIG. 5A is a perspective side view of one of the cable storage reels;

FIG. 5B is an opposite perspective side view of the cable storage reel; and

DETAILED DESCRIPTION OF THE INVENTION

Figure 3A:
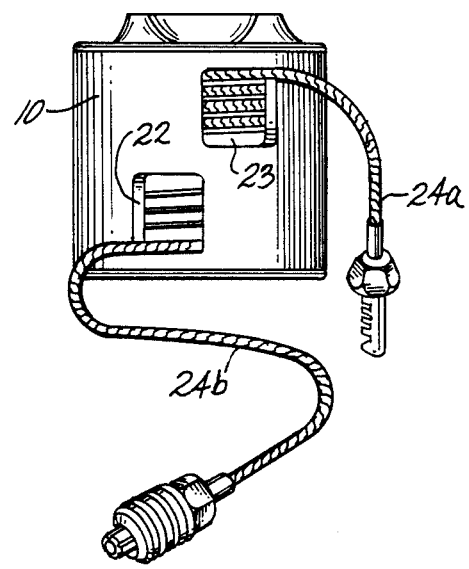
FIG. 3A is a front view with partially extended cables displaying one set of optional cable end connectors.

Referring to the drawings wherein like number refer to like parts, the locking apparatus 13 includes a cylindrical housing 10 in which are mounted a first cable storage reel 11a and a second reel 11b adjacently disposed thereto, both of which are aligned along the central axis of the reels and the housing. Two caps 14 cover both sides of the housing and each is placed at the open end of the housing to tightly seal the interior. The housing may be a lightweight plastic molding and each cap 14 may be sonically welded to the housing in order to prevent tampering with the locking mechanism. However, other lightweight materials and methods of assembly may be used.

Figure 4:
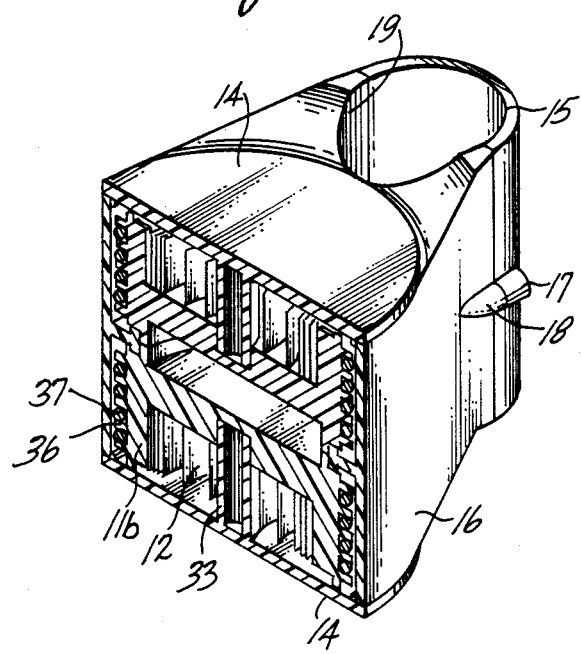
FIG. 4 is a cross-sectional, perspective view taken along the line 4—4 of FIG. 6.
Figure 6:
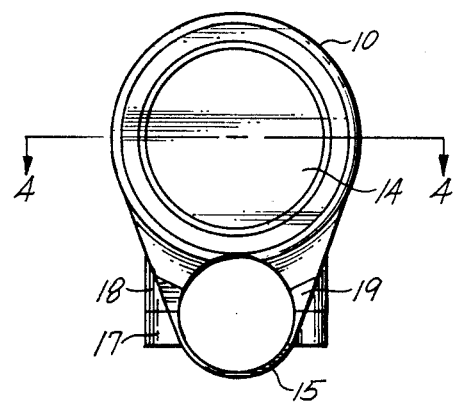
FIG. 6 shows a top view of the cable lock.

A first hollow semi-cylindrical member 19, as seen in FIGS. 2, 4, and 6, is integrally formed with the cylindrical housing 10. The member may be designed to conform in shape to a tube of the bicycle frame, as illustrated. A second hollow semi-cylindrical member 15 of diameter and length which may match the diameter and length of the first member 19 is provided to enable attachment to a bicycle frame by, for example, being secured to a tubular portion of the bicycle frame snugly disposed therebetween, as shown in FIG. 1. First semi-cylindrical member 19 and second semi-cylindrical 15 have molded extensions 18 and 17, respectively, within which are holes 20 and 21, respectively, for the purpose of receiving fastening means. Second member 15 is fastened to first member 19 by a suitable screw 16 threaded into hole 20. Each hole 20 and 21 may be lined with a hollow sleeve, preferably brass, sonically welded thereto for facilitary and strengthening attachment of screw 16. The surface of at least one of the first and second semi-cylindrical members may be at least partially ribbed.

As shown in, FIGS. 3, 4, and 5 housing 10 is provided with apertures 22 and 23 through which flexible cables 24a and 24b stored around the storage reel 11a and 11b in the housing may be dispensed. The two apertures are advantageously offset circumferentially from each other for the purpose of more conventially enabling the flexible cables to be dispensed from their respective storage reel. Metal shackles 25 are attached at the free end of at least one cable and locking means, such as a combination lock 26, may be permanently affixed to either shackle 25.

Figure 3B:
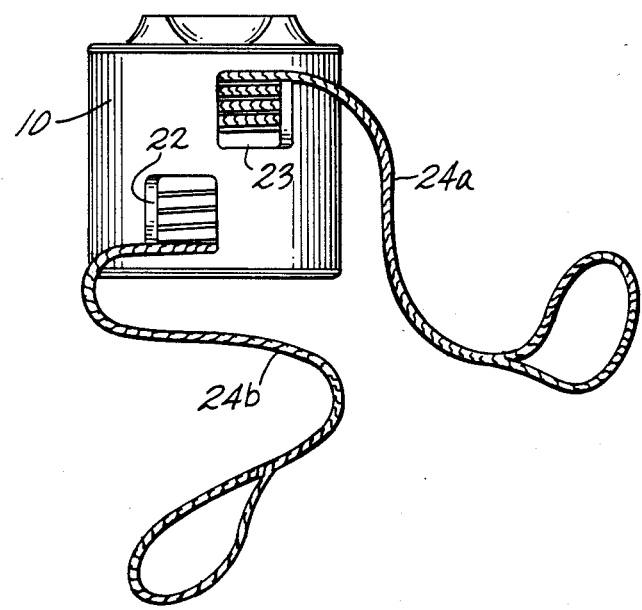
FIG. 3B is a front view with partially extended cables and with another set of optional cable end configurations.

Alternatively, the cable ends may terminate in afixed, mating male and female combination lock components as shown in FIG. 3A or in loops as shown in FIG. 3B. As can be seen, to engage the mating female and male ends of the combination lock after threading the cable ends through the bicycle wheels and frame and/or wrapping around an object, the male component is inserted into the female end.

In the embodiment shown in FIG. 3B, a separate lock, e.g., a padlock or combination lock, is used to secure the loop ends of the cables together.

Referring to FIG. 5A, each storage reel 11 has a first open cavity 28 and a jamb 29. Flexible cables 24a and 24b are attached to reels 11 by threading the cable 24 through discontinuity 38 in the jamb such that the end of the cable lies within cavity 28. A band or tube 27 capping the end of the cable prevents the cable from exiting the cavity 28 because the discontinuity in jamb 29 is sized only large enough for the width of the cable to pass through. Each reel 11 has an opening to permit the cable to pass through it and exit from hole 31 on the surface of the reel.

Biasing means such as a coiled flat spring 32 is provided in the hollow cylindrical area 12 within each reel as shown in FIG. 5B. In the embodiment illustrated, the spring is bent at a substantially right angle at its end closest to the reel's central axis so as to form tab 35. A circular cap or side wall 14 having an axially aligned molded extension 33 is divided by a slit 34 conforming in shape to tab 35 is provided to receive tab 35 to secure the spring 32.

As can be best seen in FIG. 2, each reel 11 advantageously has over its surface as cable guiding means a narrow protruding wall 36 in the form of a helix defining a long continuous groove 37 adapted to receive cable 24 therewithin. A substantial portion of cable 24 is stored around groove 37 when the cable is in the retracted position. The spring 32 biases the cable storage reel 11 against rotations so that force must be exerted to pull the stored cables out of the housing through apertures 22 and 23 and when released, the cables return to the storage reels by the force of the springs.

Although the presently preferred embodiment of the locking apparatus of the invention has been described, it is apparent that various changes and modifications may be made without departing from the invention.

For example, various attachment means such as a clamp or brace may be used to fix the housing to a bicycle frame. The cable may be varied in size, shape and length as well as type, but is preferably an elongated metal cord with a plastic skin as commonly used in ski locks. Similarly, although a combination lock has been shown attached to the cable ends to avoid the need to carry a key, other locking means may be used. The aperture through which stored cable is dispensed may be varied in shape and size, although the configurations illustrated minimize drag upon the cable when dispensed or retracted from the housing. Likewise, the housing need not be cylindrical, but may be rectangular or of other configuration so long as there is an axis for free rotation of the interior storage reels.

Other changes or modifications will be apparent to those skilled in the art and are contemplated within the scope of the invention. Accordingly, the scope of the invention is limited only by the appended claims wherein:

What is claimed is:

1. A locking apparatus comprising:
   a housing having an external housing wall, first and second apertures in said wall, opposite side walls and a central axis;
   first and second cable storage reels disposed within said housing adjacent each other, each reel being adjacent an opposite side wall and being independently rotatable about said axis;
   a separate elongated flexible cable wound around each of said first and second cable storage reels with one end of each cable fixed to the reel and the other end free and extractable through one of said first and second apertures in the external housing wall;
   a coiled spring disposed within each cable storage reel for biasing said reel in a cable retracted position against rotational movement;
   means associated with each opposite side wall for securing one end of the coiled spring adjacent to said side wall;

means fixed to the free ends of said cables for enabling said cables to be secured to each other;

said separate cables being capable of being independently withdrawn and extended from said cable storage reels through said apertures to enable securing the ends thereof and of being automatically retracted onto said cable storage reels by the force of said biasing means when said cables are unsecured.

2. A locking apparatus according to claim 1 further comprising means for securing said apparatus to the frame of a bicycle.

3. A locking apparatus according to claim 2 wherein the free end of at least one of said cables terminates in a shackle.

4. A locking apparatus according to claim 2 further comprising locking means to secure the free ends of said cables together.

5. A locking apparatus according to claim 4 wherein said locking means comprises a combination lock, said combination lock comprising a female component affixed to the free end of one cable and a male component affixed to the free end of the other cable.

6. A locking apparatus according to claim 1 further comprising means for guiding the cables around their respective cable storage reel during extension and retraction thereof.

7. A locking apparatus as claimed in claim 6 wherein said guiding means is integrally formed with each reel.

8. A locking apparatus as claimed in claim 6, wherein said guiding means is in the form of a single, continuous groove in the form of a helix on the surface of the reel with said groove conforming in configuration to the cross-section of the cable so as to receive said cable therein and guide said cable onto and off of the surface of the reel upon retraction and extension thereof.

9. A locking apparatus as claimed in claim 1 wherein the housing is constructed of lightweight plastic.

10. A locking apparatus as claimed in claim 2 wherein said means for securing said apparatus to the frame of a bicycle comprises a first hollow semi-cylindrical member extending from the housing and integrally formed therewith and a second semi-cylindrical, member conforming in shape to the first semi-cylindrical member, said members being fastenable about a tubular bicycle frame fit snugly therebetween, and means for securing said semi-cylindrical members to each other.

11. A locking apparatus comprising:
a housing having an external wall, first and second apertures in said external housing wall, opposite side walls and a central axis;
first and second cable storage reels disposed within said housing adjacent each other with each reel being adjacent an opposite side wall, said reels being independently rotatable about said axis;
a separate elongated flexible cable wound around each of said first and second cable storage reels with one end of each cable fixed to the reel and the other end free and extractable through one of said first and second apertures in the external housing wall;
separate and independent biasing means in the form of a coiled spring disposed within each cable storage reel, said biasing means biasing said reel in a cable retracted position against rotational movement;
means associated with each opposite side wall for securing an end of the coiled spring adjacent to said side wall;
means fixed to the free ends of said cables for enabling said cables to be secured to each other;
cable guiding means on the surface of each reel for guiding the cables around their respective cable storage reel during extension and retraction of said cables;
said cable guiding means comprising a single, continuous groove in the form of a helix on the surface of the reel with said groove conforming in configuration to the cross-section of the cable so as to receive said cable therein and guide said cable onto and off of the surface of the reel;
said separate cables being capable of being independently withdrawn and extended from said cable storage reels through said apertures in said external wall of said housing to enable securing the ends thereof together and of being automatically retracted onto said cable storage reels by the force of said biasing means when said cables are unsecured.

* * * * *

UNITED STATES PATENT AND TRADEMARK OFFICE
CERTIFICATE OF CORRECTION

PATENT NO. : 4,970,882

DATED : November 20, 1990

INVENTOR(S) : Ralph A. Arredondo

It is certified that error appears in the above-identified patent and that said Letters Patent is hereby corrected as shown below:

On the Front Page:

[76] Inventor: Change "Ralph A. Arrendondo" to
-- Ralph A. Arredondo --.

Abstract, line 8, change "sufficently" to -- sufficient --.

Column 1, line 28, change "unsightly and bulky" to
-- unsightly, bulky, and --.

Column 2, line 16, before "extracted" insert -- housing. Affixed to each reel is a cable that can be --.

Column 3, line 38, after "in" move the comma to come after "5".

Column 3, line 43, change "conventially" to
-- conveniently --.

Column 3, line 49, change "afixed" to -- affixed --.

UNITED STATES PATENT AND TRADEMARK OFFICE
CERTIFICATE OF CORRECTION

PATENT NO. : 4,970,882

DATED : November 20, 1990

INVENTOR(S) : Ralph A. Arredondo

It is certified that error appears in the above-identified patent and that said Letters Patent is hereby corrected as shown below:

In the Claims

Column 5, line 43, delete the coma after "semi-cylindrical".

Signed and Sealed this

Twenty-second Day of September, 1992

Attest:

DOUGLAS B. COMER

*Attesting Officer*   Acting Commissioner of Patents and Trademarks